Sept. 16, 1969    G. R. SMITH    3,466,947
RELEASABLE ONE-WAY DEVICE AND TRANSMISSION
Filed Nov. 8, 1967    2 Sheets-Sheet 1

INVENTOR.
George R. Smith
BY
Charles R. White
ATTORNEY

Sept. 16, 1969            G. R. SMITH            3,466,947

RELEASABLE ONE-WAY DEVICE AND TRANSMISSION

Filed Nov. 8, 1967            2 Sheets-Sheet 2

INVENTOR.
George R. Smith
BY
Charles R. White
ATTORNEY

United States Patent Office 3,466,947
Patented Sept. 16, 1969

3,466,947
RELEASABLE ONE-WAY DEVICE AND TRANSMISSION
George R. Smith, Bloomfield Hills, Mich., assignor to General Motors Corporation, Detroit, Mich., a corporation of Delaware
Filed Nov. 8, 1967, Ser. No. 681,538
Int. Cl. F16d 65/24, 43/00, 21/02
U.S. Cl. 74—759          7 Claims

ABSTRACT OF THE DISCLOSURE

A transmission having planetary gearing controlled by friction devices, which are engaged in a predetermined sequence to provide a plurality of forward drive ratios and a reverse drive ratio. One of the devices is a one-way brake having a plurality of nested and spiraled friction bands each having an anchor end connected to an outer race operatively secured to the gearing and having a free end disposed in a tapered groove formed in a grounded inner race. This brake automatically engages to hold a control gear from reverse rotation to condition the gearing for low and intermediate drive ratios and automatically disengages in direct drive and overdrive ratios. To enable the transmission to be conditioned for reverse drive, a hydraulically actuated motor mechanism, disposed beneath the friction bands is actuated to move the bands to an inactive position to allow the above mentioned control gear to rotate in a reverse direction. A return spring is disposed between the motor mechanism and the bands to move the motor mechanism back to an inactive position to permit the one-way brake to function as described in the forward drive ratios.

---

This invention relates to a one-way brake or clutch having friction members disposed between relatively rotatable races to prevent relative rotation in a first direction and permit relative rotation in an opposite direction and incorporaing a motor mechanism for moving the friction members to an inactive position between the races to permit relative rotation in the first direction.

Many types of overrun or one-way friction devices have been extensively employed for frictionally connecting two relatively rotatable race members in response to attempted relative rotation in a first direction and for disconnecting the members in response to relative rotation in an opposite direction. Among such devices are one-way clutches and brakes of the type having friction bands with one end anchored in one race and the other end portion disposed in a tapered groove in the other race. These bands energize on attempted relative rotation of the races in one direction and de-energize in response to relative rotation in an opposite direction. However, in many situations it is desirable to have the inner and outer members relatively rotatable in either direction. Accordingly, this invention is directed to a one-way device incorporating a motor mechanism for displacing the bands of the one-way friction mechanism to a position where it will not engage regardless of direction of relative rotation. This motor mechanism is preferably hydraulically actuated; however, it may be actuated by mechanical, electrical or magnetic means. When the apply force is removed from the motor mechanism, spring means are provided to move the motor mechanism back to an inactive position to allow the friction bands to function as intended to provide for the one-way frictional connection or for overrun.

This invention can be employed in many different environments but is particularly useful in automatic transmissions in which a one-way device is utilized to condition a gear set for predetermined forward ratio drives by holding a control member of the gearing from rotation in one direction. This one-way device overruns in an opposite direction to permit the gearing to be conditioned for other forward ratios. Since rotation of the control member in the first mentioned direction is often needed for reverse ratio drive, a motor mechanism is employed to move the one-way friction means to an inactive position so that this latter drive can be accomplished.

Figure 1:
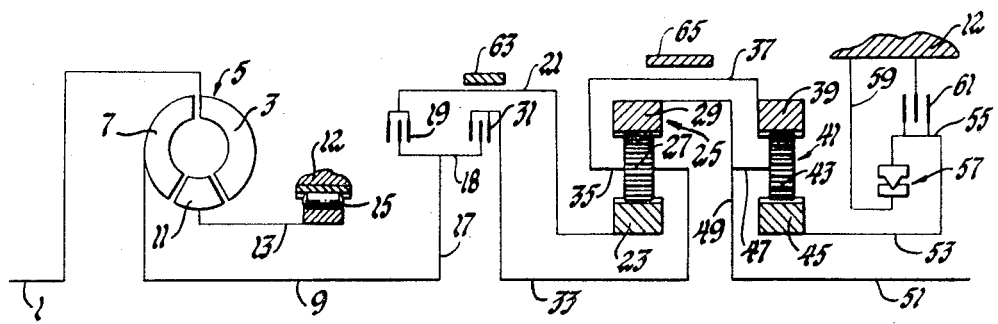
FIGURE 1 is a diagrammatic view of a planetary gear transmission.

In FIG. 1 there is a transmission having an input 1 operatively connected to a pump 3 of a torque converter 5, which has a turbine 7 connected to a drive shaft 9, and a stator 11 connected to the transmission case 12 by a ground sleeve 13 and a one-way brake 15. Drive shaft 9 is drivingly connected to a hub 17. This hub has an outer annulus 18 which has external splines to support alternate plates of a multiplate friction clutch 19 that is selectively engageable to connect the turbine driven hub 17 to a drum 21 that, in turn, is connected to a sun gear 23 of a planetary gear set 25. This gear set has planet gears 27 which mesh with the sun gear and a ring gear 29.

The hub 17 also supports alternate friction plates of a multi-plate friction clutch 31 that is connected to a drive shaft 33 coupled to a carrier 35 that carries the planet gears 27. This carrier is also connected by a drum 37 to a ring gear 39 of a planetary gear set 41 having planet gears 43 meshing with the ring gear 39 and with a sun gear 45. Planet gears 43 have a carrier 47 connected to a hub 49 secured to the ring gear 29 of the first planetary gear set and to a transmission output shaft 51. The sun gear 5 of the second planetary gear set 41 is secured by sleeve shaft 53 and an annulus 55 to the outer race of a one-way brake 57. The inner race is connected by an annular flange 59 to the transmission case. The drum 55 is splined to support alternate plates of a multi-plate friction clutch 61 also including plates that are splined directly or indirectly to the inside of the transmission case. A brake band 63 is selectively engageable with the drum 21 and brake band 65 is selectively engageable with the drum 37. These two brake bands and the other selectively engageable friction devices described above are operated by controls not illustrated to establish low, second, high, overdrive and reverse drive ratios which are set forth in that order as ranges 1, 2, 3, 4 and R in the chart which follows. Ranges 1–4 are automatically selected in response to output speed and torque demand signals by setting the controls for forward drive. In this chart "X" indicates engagement of the indicated friction device and "O" indicates disengagement. The condition of the one-way brake is set forth separately in the last column.

| Ranges | 19 | 31 | 63 | 65 | 57 |
|---|---|---|---|---|---|
| 1 | X | O | O | O | Engages. |
| 2 | O | X | O | O | Do. |
| 3 | X | X | O | O | Overruns. |
| 4 | O | X | X | O | Do. |
| R | X | O | O | X | Released. |

In neutral the selectively engagebale friction devices are released. Friction brake 61 is selectively engageable by operation of a hydraulically actuated piston and is on only in manual low or second and can be used as a coast brake.

It will be noted that the one-way friction device engages automatically in low and intermediate ranges and is automatically released in the high and overdrive ranges. In reverse the one-way brake must be completely released to permit the sun gear 45 to rotate rearwardly. With a conventional one-way brake this could not be accomplished in the described transmission because it would engage and prevent reverse rotation of the output shaft. However, the one-way brake of this invention readily permits the reverse rotation. The preferred construction of the one-way brake and the mechanism for releasing the one-way brake to permit it to disengage in reverse drive are illustrated in FIGS. 2 and 3.

The one-way brake 57 of this invention has an outer race 65 securely connected by the hub 67 of annulus 55 to the sleeve shaft 53 and has an inner race 69 integral with the annular flange 59. The inner periphery of the outer race is formed with spaced recesses 71 for the reception of the anchors 73 of the spiraled-spring steel bands 75. These bands are stacked or nested on each other in an orderly fashion and each band tapers from a maximum width at its anchor end to a minimum width at its free extremity to fit into the tapered part of the annular groove 77, having a cross section which is generally similar to that of a funnel formed in the inner race 69. As shown best by FIG. 2 this groove has annular tapering side walls which converge inwardly and toward each other to a point of minimum width; each wall then extends radially inwardly and in parallel to the other wall to the bottom of the groove.

Figure 2:
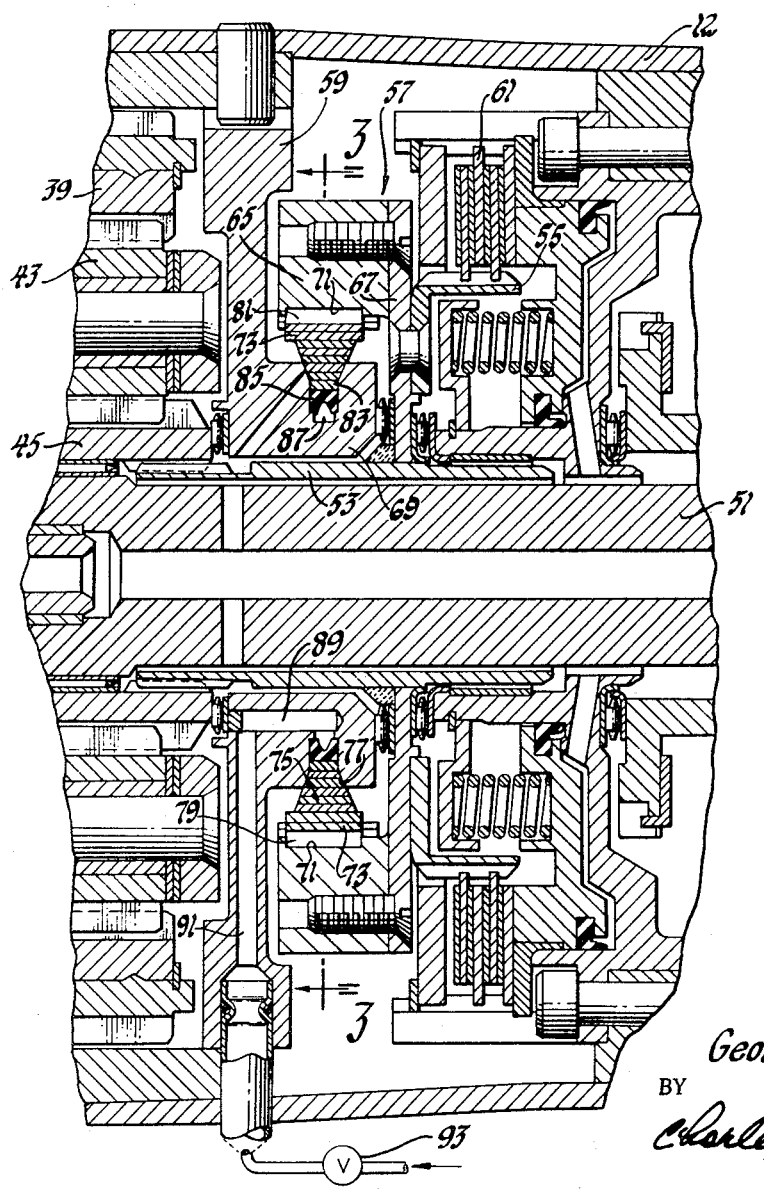
FIGURE 2 is a longitudinal cross-sectional view of a portion of the planetary transmission of FIG. 1 and is also a view taken along lines 2–2 of FIG. 3 illustrating details of a preferred embodiment of the invention.
Figure 3:
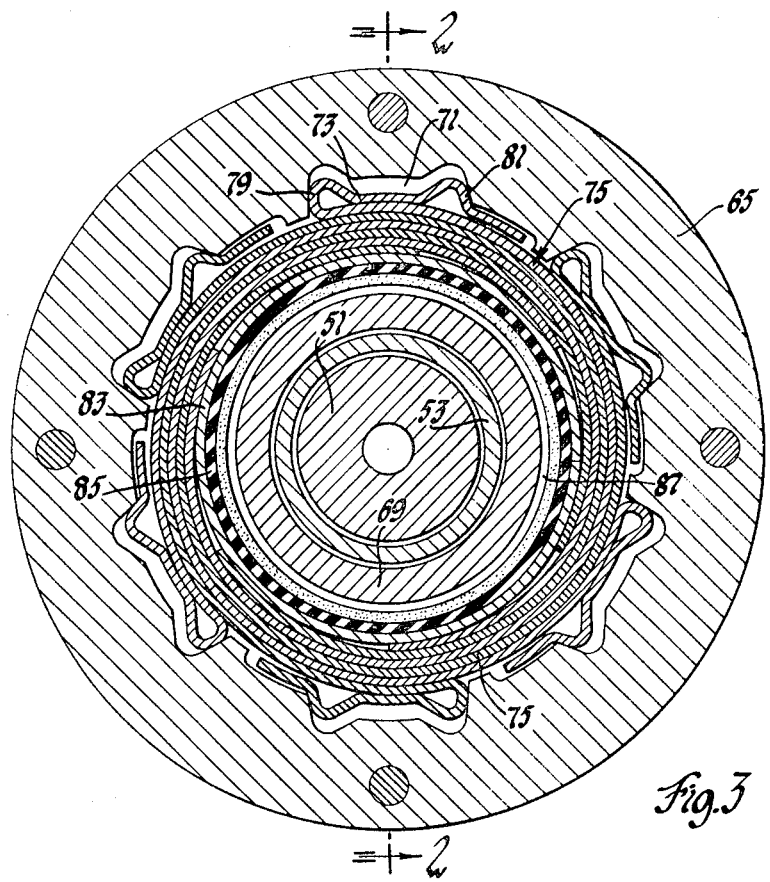
FIGURE 3 is a cross-sectional view taken along lines 3–3 of FIG. 2.
Figure 4:
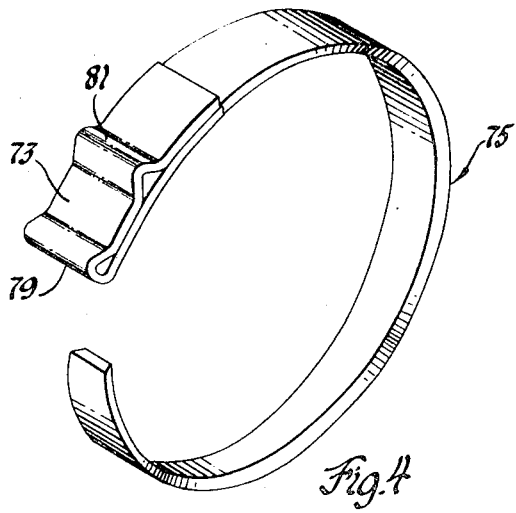
FIGURE 4 is a perspective view of a band element of the one-way brake of FIGS. 2 and 3.

As shown in FIGS. 2 and 4, each band also has tapered side edges which match the tapered side walls of the groove. The free portion of each band spirals around inwardly into the groove terminating therein near its respective anchor. As shown in FIGS. 3 and 4, each anchor 73 is formed by doubling over one end of the band, to provide a release face 79 and a spaced apply face 81. These faces contact opposing end walls of the recess 71 in the outer race 65. Each of the free ends of the anchor terminates in the V portion of the groove proximate to the split, circular steel spring 83 mounted on an annular elastomeric seal 85 which may be an O-ring seated in the straight wall portion of the groove. This seal provides a motor mechanism to exert a radial force on the bands under certain operating conditions. This seal co-operates with the straight side walls of the grooves to form an expansible chamber 87 that is communicable by passages 89 and 91 with a valve 93 which controls the flow of pressure fluid into and exhaust of fluid from the chamber. When the transmission controls are set for reverse drive, this passage is open to pressure fluid to effect deactivation of the one-way brake as will be later described; when the transmission is set for other drive ranges, the chamber is exhausted so the brake can operate to brake or overrun depending upon the dynamic operating conditions of the transmission.

When the transmission is conditioned for automatic operation, the controls will be set for forward drive. Since there will be high torque demand, clutch 19 will be engaged automatically. The torque path from the converter will be the sun gear of the front gear set 25 and out of the front carrier 35 into the ring gear 39 of the rear planetary gear unit 41. This ring gear is driven clockwise at reduced speed. Under these conditions the one-way brake 57 is engaged with the reaction force being applied to the apply face 81. The output shaft 51 will then be driven forwardly at a low speed with high torque. In the one-way brake the friction force on the sides of the bands will cause the bands to wrap up and wedge tightly in the tapered portion of the groove to make the frictional connection between the outer inner races.

In second range with clutch 31 engaged the ring gear 39 is driven forwardly at turbine speed and the one-way brake 57 actuates as described above to condition the gear set for increased speed and reduced torque multiplication.

In third range the gear sets are locked up and rotate as a unit since both clutches 19 and 31 are engaged. In the one-way brake 57 the outer race is also rotating forwardly. Since force will be against the release face 79, the bands will unwrap to disengage the sides of the bands and the tapered walls of groove 77.

In fourth range or overdrive, band 63 is applied to hold sun gear 23, and clutch 31 is engaged to drive carrier 35. Under these conditions ring gear 29 will be driven in an overdrive ratio for economical cruising operation. One-way brake 57 will overrun as described in connection with the direct drive ratio.

In reverse, clutch 19 and band 65 are engaged. Under these conditions the outer race of the one-way brake will be driven rearwardly along with the carrier 49 connected to the output shaft 51. To prevent engagement of the one-way brake under these conditions, the chamber beneath the O-ring seal is pressurized by operation of the valve mentioned above. When the chamber 87 is pressurized with sufficient pressure, for example 40 pounds p.s.i., it expands and the seal and the spring 83 move outwardly and transmit a radial force to the bands to lift them from engagement with the side walls of the tapered grooves to effect their disengagement. When disengaged, the outer race can rotate rearwardly and the transmission can function to provide the reverse drive.

To allow the bands to re-engage, as in automatic low or second, the valve 93 will be actuated to open chamber to exhaust allowing the circular spring to constrict and return the seal to an inoperative position and the bands of the clutch again operate as described above to re-establish a drive. The spring also operates to protect the seal from abrasion by the free ends of the spiral bands.

This invention may be employed in environments other than that illustrated and particularly described above. For example, it may be used in engine starter motor applications to provide for complete release of a one-way clutch after the engine has been started without utilizing other mechanisms to disconnect the drive between the starter motor and the engine. This invention may be used also in hydraulic torque converter applications to provide a mechanism for holding the stator to allow the converter to multiply input torque in a conventional manner. However, this stator may be released at any time by application of the motor mechanism to permit the converter to act as a fluid coupling. Accordingly this invention is not to be limited by the particular embodiments and environments shown and described since other variations and modifications may now be readily made utilizing the teachings and concepts described above.

I claim:

1. In a transmission having an input and an output, a planetary gear unit for transmitting torque from said input to said output and providing a plurality of input to output speed ratios, a pluarlity of drive establishing devices operatively connected to said gear unit engageable in a predetermined order to condition said gear unit for said ratios, said gear unit having a rotatable control member, one of said devices being a one-way coupling device operatively connected to said control member having coupling means automatically engageable to prevent rotation of said control member in a first direction to thereby condition said gear unit for one of said ratios and automatically disengageable in response to rotation of said control member in an opposite direction on selective engagement of another of said drive establishing devices to permit said gear unit to provide another of said ratios, and motor means radially disposed in said one-way coupling device and operatively connected to said coupling means for radially moving said coupling means to an inoperative position deactivating said one-way coupling device to thereby permit said control member to rotate in said first direction on engagement of still another of said drive establishing devices to condition said gear set for still another ratio.

2. A one-way coupling device having relatively rotatable first and second members, said coupling device having friction means operative to frictionally couple said members in response to relative rotation of said members in a first direction and operative to disconnect said members in response to relative rotation in an opposite direction, motor means operatively connected to said friction means for deactivating said friction device, said one-way coupling device having inner and outer races and said friction means comprising a plurality of friction bands disposed between said races, each of said bands having an anchor fixed to one of said races and a free end portion disposed in the other of said races, said motor means being located in said last mentioned race and interiorly of said bands and being energizable to move said bands to an inactive position between said races to permit relative rotation of said races in either direction.

3. In a one-way friction device having first and second relatively rotatable members, nested spiral band friction means disposed between said members and operative in response to relative rotation of said members in a first direction to frictionally connect said members and subsequently operative in responsive to relative rotation of said members in an opposite direction to disconnect said members, motor means disposed beneath said friction means in one of said members for applying a release force to said friction means to displace said friction means to a position between said members to prevent the frictional connection of said members by said friction means when said relative rotation is in said first direction.

4. A one-way friction device having relatively rotatable first and second members, a plurality of friction units disposed between said members and operative in response to relative rotation of said members in one direction to frictionally connect said members and further operative in response to relative rotation of said members in an opposite direction to disconnect said members, a unitary motor mechanism disposed between said members and radially inwardly of said friction units for simultaneously shifting said units to a position between said members to effect the disconnect of said members subsequent to relative rotation of said members in said first mentioned direction and subsequent to the frictional connection of said members by said friction units.

5. An overrun coupling comprising a first member, a plurality of overlapping spiraled friction devices each anchored to said first member, a second member having an annular groove formed therein and defined in part by converging side wall portions, each of said friction devices having a tapered free end portion disposed in said groove with sides which match the converging sides of said groove, an actuator disposed in said groove inwardly of said tapered side wall portions and said free end portions of said friction units, said actuator and said groove defining an expandable and contractible chamber, means for supplying fluid under pressure to said chamber to expand said chamber and thereby move said free end portions of said friction members to an inactive position which permits relative rotation between said members in either direction and for exhausting fluid from said chamber to contract said chamber and permit said friction units to wrap and wedge when driven in one direction to frictionally connect said first and second members.

6. The overrun coupling defined in claim 5 and further including spring means disposed between said actuator and said free end portions of said friction units which contracts when said chamber is exhausted to move said actuator inwardly in said groove.

7. The coupling defined in claim 5, said groove having an annular position located inwardly of the first mentioned part, said actuator being an elastomeric seal which cooperates with said last mentioned portion of said groove to define said expansible chamber, said seal being movable outwardly when said chamber is supplied with fluid pressure to lift said friction devices from frictional engagement with the converging side walls of said groove.

References Cited
UNITED STATES PATENTS

| | | | |
|---|---|---|---|
| 2,395,459 | 2/1946 | Carnagua | 74—759 |
| 2,423,315 | 7/1947 | Hollerith | 188—152.86 |
| 2,593,568 | 4/1952 | Kelbel | 74—759 |
| 3,134,471 | 5/1964 | Croswhite | 192—44 |
| 3,187,512 | 6/1965 | Gabriel | 192—44 X |
| 3,193,067 | 7/1965 | Dodwell. | |
| 3,233,478 | 2/1966 | General et al. | 188—82.3 X |
| 3,238,814 | 3/1966 | Jandasck | 192—44 X |
| 3,260,331 | 7/1966 | Borman | 188—170 X |

DONLEY J. STOCKING, Primary Examiner

T. C. PERRY, Assistant Examiner

U.S. Cl. X.R.

188—82.3, 82.6, 170; 192—41, 91